Dec. 28, 1948.   B. F. NEWTON   2,457,485
CAGE FOR ROLLER BEARINGS
Filed Feb. 9, 1945
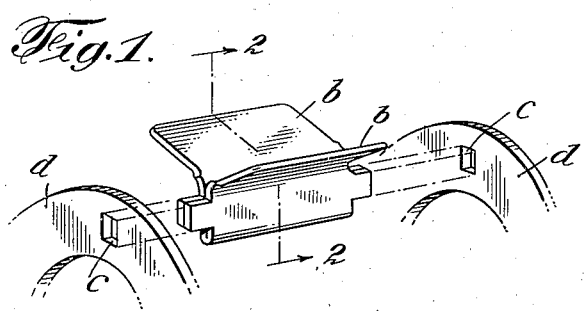
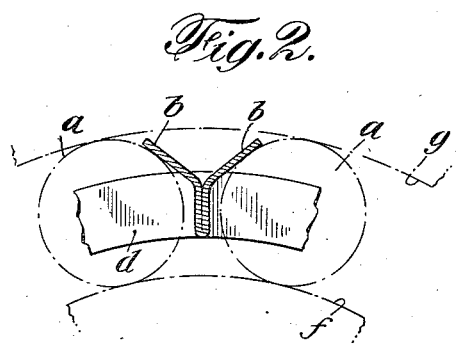
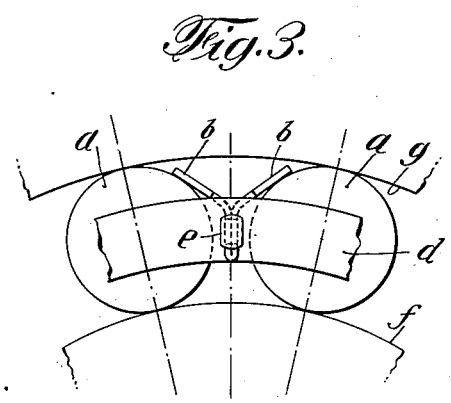
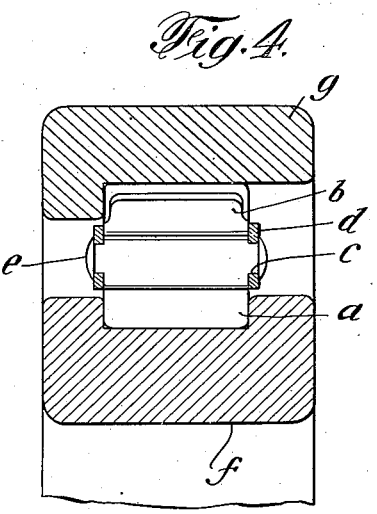
INVENTOR
*Bertie Frederick Newton*
BY *C. P. Goepel*
his ATTORNEY Patented Dec. 28, 1948

2,457,485

UNITED STATES PATENT OFFICE 2,457,485

CAGE FOR ROLLER BEARINGS

Bertie Frederick Newton, Chelmsford, England, assignor to Norma Hoffmann Bearings Corporation, Stamford, Conn.

Application February 9, 1945, Serial No. 576,944
In Great Britain March 31, 1944

1 Claim. (Cl. 308—217)

The present invention relates to a cage for roller bearings, such cage being of the kind comprising a pair of rings or side plates connected together by a plurality of bridging members by means of which adjacent rollers are separated from one another.

According to the present invention the separating members are substantially Y-shaped, each arm of a Y engaging a part of the periphery of a roller, whilst the tail portion of the Y is rigidly attached to the rings in order to secure the rings and separators together. Any suitable method of attachment may be employed, e. g., riveting or spot welding. It will be obvious that the arms of the Y may extend radially inwardly or outwardly.

The separators protrude radially from the rings or side plates, and in order to avoid fouling the lips of races which are used in some types of roller bearings, the protruding portions, which form the arms of the separators, are conveniently made narrower than the part located between the side plates.

One form of construction of the invention is illustrated in the annexed drawings, in which:

Fig. 1 is a perspective view of an embodiment of my invention.

Fig. 2 is a sectional view of the same.

Fig. 3 is a part front elevation, and

Fig. 4 is a part end elevation.

In these drawings the rollers $a$ are separated from one another by means of Y-shaped separating members $b$, one member $b$ being disposed between each adjacent pair of rollers. The Y-shaped separating members have two arms, each arm engaging a portion of one roller, whilst the tail portion of Y passes through holes $c$ in the rings $d$ that form part of the cage, the lower portion of the tail of the Y being secured by a rivet $e$ to the outer surface of the rings. The inner race $f$ and the outer race $g$ are shown in Fig. 2, and as can be seen from this figure the protruding portions, which form the arms of the separators are made narrower than the part located between the side plates for the purpose previously mentioned.

I claim:

In a roller bearing having rollers and a pair of spaced parallel roller end aligning rings with circumferentially disposed spaced openings, Y-shaped roller separating members having in combination a single piece of sheet metal with a bend for overlapping contacting stem portions forming the stem of the Y, and each stem portion at its upper end having a bend at an obtuse angle with the stem portion to form the V portion of the Y, the stem portions being spaced from the rollers, the stem and parts of the V portions adapted to abut at their lateral ends against the inner surfaces of the rings, with the other lateral parts of the V portions free of contact with the rings and extending outwardly beyond the same, said last named lateral parts being axially narrower than the stem portions for entry into the race of the rollers and for yieldingly contacting with the rolling surfaces of the adjacent rollers, and said stem portions each having a lateral extension at each end passing through an opening in the ring and engaging the outer surface of the ring.

BERTIE FREDERICK NEWTON.

REFERENCES CITED

The following references are of record in the file of this patent:

UNITED STATES PATENTS

| Number | Name | Date |
|---|---|---|
| 1,073,501 | Lewis | Sept. 16, 1913 |
| 1,159,072 | Newmann | Nov. 2, 1915 |
| 1,365,596 | Lockwood | Jan. 11, 1921 |
| 1,389,313 | Lockwood | Aug. 30, 1921 |